United States Patent
Kobayashi

(10) Patent No.: US 8,788,198 B2
(45) Date of Patent: Jul. 22, 2014

(54) DATA MANAGEMENT SYSTEM AND METHOD FOR UPDATING DATA

(75) Inventor: Yukihiko Kobayashi, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 605 days.

(21) Appl. No.: 11/892,602

(22) Filed: Aug. 24, 2007

(65) Prior Publication Data

US 2008/0059503 A1    Mar. 6, 2008

(30) Foreign Application Priority Data

Aug. 29, 2006    (JP) ................... 2006-232205

(51) Int. Cl.
*G01C 21/00* (2006.01)
*G01C 21/32* (2006.01)
*G01C 21/26* (2006.01)
*G06F 17/30* (2006.01)

(52) U.S. Cl.
CPC ............... *G01C 21/32* (2013.01); *G01C 21/26* (2013.01); *G06F 17/30241* (2013.01)
USPC ............ 701/450; 701/451; 701/452; 701/453

(58) Field of Classification Search
CPC .. G01C 21/00; G01C 21/32; G06F 17/30241; G06F 17/30345
See application file for complete search history.

(56) References Cited

U.S. PATENT DOCUMENTS

| | | | |
|---|---|---|---|
| 6,336,111 B1 * | 1/2002 | Ashby et al. | 707/715 |
| 6,453,233 B1 * | 9/2002 | Kato | 701/451 |
| 2002/0010542 A1 * | 1/2002 | Ahrens et al. | 701/200 |
| 2002/0073067 A1 * | 6/2002 | McGrath et al. | 707/1 |
| 2003/0028315 A1 * | 2/2003 | Miyahara | 701/208 |
| 2004/0193370 A1 * | 9/2004 | Umezu et al. | 701/210 |
| 2004/0220957 A1 * | 11/2004 | McDonough | 707/102 |
| 2005/0038599 A1 * | 2/2005 | Lehmann et al. | 701/208 |
| 2005/0149257 A1 * | 7/2005 | Linkohr | 701/208 |
| 2005/0192950 A1 * | 9/2005 | Nomura | 707/3 |
| 2006/0074547 A1 * | 4/2006 | Kaufman et al. | 701/200 |

(Continued)

FOREIGN PATENT DOCUMENTS

| | | |
|---|---|---|
| JP | A-10-283319 | 10/1998 |
| JP | A-2004-287705 | 10/2004 |
| JP | A-2005-025672 | 1/2005 |
| WO | WO 2006/011278 A1 | 2/2006 |

OTHER PUBLICATIONS

Nov. 7, 2012 European Search Report issued in EP 07 11 4977.

(Continued)

*Primary Examiner* — Daniel Kinsaul
(74) *Attorney, Agent, or Firm* — Oliff PLC

(57) ABSTRACT

Systems and methods store information data in an information data frame, including retrieval keys, and store pertinent data specifying the information data in a pertinent data frame for each individual category specified by the retrieval keys. The systems and methods receive an updating file containing updating information data for updating information data subject to update. The systems and methods extract the information data subject to update from the information data frame and update the extracted information data with the updating information data contained in the received updating file. The systems and methods extract the pertinent data in a category specified by a retrieval key contained in the information data subject to update from the pertinent data frame and update the extracted pertinent data with the updating information data contained in the updating file.

17 Claims, 8 Drawing Sheets

(56) References Cited

U.S. PATENT DOCUMENTS

| | | |
|---|---|---|
| 2006/0080030 A1* | 4/2006 | Okude et al. .................. 701/208 |
| 2006/0095202 A1* | 5/2006 | Atarashi et al. ............... 701/208 |
| 2006/0184317 A1* | 8/2006 | Asahara et al. ............... 701/208 |
| 2007/0282524 A1* | 12/2007 | Tanizaki et al. ............... 701/208 |
| 2008/0228712 A1* | 9/2008 | Nomura ........................... 707/3 |

OTHER PUBLICATIONS

Japanese Patent Office, Notification of Reason(s) for Refusal mailed Sep. 15, 2011 in Japanese Patent Application No. 2006-232205 w/Partial English-language Translation.

* cited by examiner

DATA MANAGEMENT SYSTEM AND METHOD FOR UPDATING DATA

INCORPORATION BY REFERENCE

The disclosure of Japanese Patent Application No. 2006-232205 filed on Aug. 29, 2006, including the specification, drawings and abstract is incorporated herein by reference in its entirety.

BACKGROUND

1. Related Technical Fields

Related technical fields include data management systems and methods for updating data.

2. Related Art

Conventional navigation devices provide course guidance to a destination. Conventional navigation devices have a storage medium that stores map data related to maps and displaying maps, which is read out from the storage medium on a monitor together with a position of the vehicle detected by a GPS receiver. Conventional navigation devices generally have a built-in hard disk of a large storage capacity as a storage medium.

Such a built-in hard disk is configured to update the data stored in the aforementioned storage medium, not by replacing discs (e.g., DVD, CD-ROM and such), but by an updating file via, for example, a medium of a small capacity or a predefined communication network such as a mobile telephone.

Data is generally stored in the built-in hard disk in record units that include a plurality of fields. Such data is updated, not by updating the entirety of the stored data, but by updating data in the record units according to "differential updating" (see, e.g., Japanese Patent Application Publication No. JP-A-2004-287705).

In "differential updating," an updating file having only new records which require updating is created and the navigation device updates the data stored in the storage medium by way of accepting the entry of the updating file and renewing each records-record subject to update stored in the storage medium by replacing all of the data of each records record which required updating. Even though such records may have only required updating of as little as single byte of data. Therefore, the amount of data in the aforementioned updating file is less than all of the data stored in the built-in hard disk because the records that do not require updating are not included.

Another navigation device is known, which gives search guidance of spot information, by storing data relating to spot information in a storage medium and displaying the information retrieved from the storage medium on a monitor (see, e.g., Japanese Patent Application Publication No. JP-A-2005-25672 and Japanese Industrial Standards (JIS) D-0810, for example). Specifically, with a navigation device, which provides search guidance of spot information, information data and data specifying the information data is stored in an information data frame data. The information data and specifying data is stored for each category specified by retrieval keys.

By the entry of retrieval keys (such as a name pronunciation, telephone number, and address of a spot), pertinent data in the category specified by the retrieval keys entered is extracted successively from the data frame and the name of the spot contained in the extracted pertinent data are displayed on a monitor. Further, when one of the pertinent displayed data is selected, an address is referenced, the information data specified by the pertinent data is extracted successively from the aforementioned information data frame, and the detailed information of the spot and such contained in the extracted information data is displayed on the monitor.

When updating the aforementioned pertinent data and the aforementioned information data, differential updating may be used. Specifically, as shown in FIGS. 7 and 8, an updating file that contains both the entire pertinent data frame in which the latest updating pertinent data to be stored in the storage medium are stored and the entire information data frame in which the latest updating information data to be stored in the storage medium are stored may be accepted (S11). Then, as indicated by the arrow A' in FIG. 8, the navigation device extracts information data subject to update (S12) and, as indicated by the arrows a' in FIG. 8, updates the extracted information data with the updating information data contained in the updating file (S13). Similarly, as indicated by the arrow B' in FIG. 8, the navigation device extracts pertinent data subject to update (S14) and, as indicated by the arrow b' in FIG. 8, updates the extracted pertinent data with the updating pertinent data contained in the aforementioned updating file (S15).

SUMMARY

In the navigation device described above, the amount of pertinent data and information data stored in the storage medium increases in accordance with an improvement of performance, and further, by frequent changes of spot information, the enormous amount of data needs to be updated frequently.

Therefore, there have been problems in that the capacity of an updating file which contains both new pertinent data and information data becomes very large, and the volume of communication and the memory capacity for an entry of the updating file as well as an updating time increase.

Various exemplary implementations of the broad principles described herein may provide further reduction in the capacity updating files.

Various exemplary implementations provide systems and methods that may store information data in an information data frame, including retrieval keys, and may store pertinent data specifying the information data in a pertinent data frame for each individual category specified by the retrieval keys. The systems and methods may receive an updating file containing updating information data for updating information data subject to update. The systems and methods may extract the information data subject to update from the information data frame and may update the extracted information data with the updating information data contained in the received updating file. The systems and methods may extract the pertinent data in a category specified by a retrieval key contained in the information data subject to update from the pertinent data frame and may update the extracted pertinent data with the updating information data contained in the updating file.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Examples of a data management system and a method for updating data in the context of a navigation device will be described with reference to the drawings.

Figure 1:
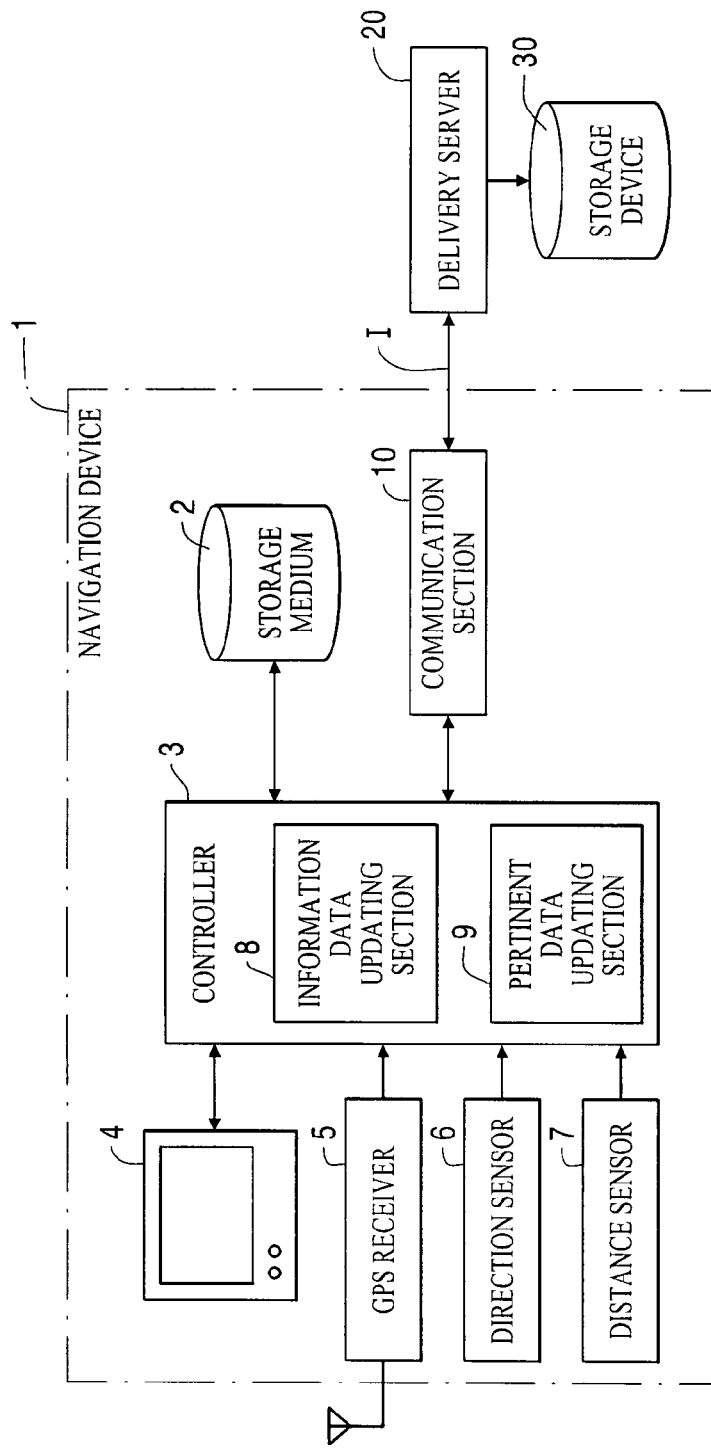
FIG. 1 is a block diagram illustrating an exemplary navigation device.

As shown in FIG. 1, a navigation device 1 may be functionally, physically, and/or conceptually composed of various sections. The sections may perform various processes according to the data entered through a controller 3, e.g., a CPU. The sections may be implemented by hardware, software (programs), or a combination of both.

The navigation device 1 may have a memory, such as a built-in rewritable storage medium in which map data relating to maps, information data relating to spot information, and such may be stored. The storage medium 2 may be structured as or similar to a hard disk drive.

The aforementioned navigation device 1 may be configured to provide course guidance up to a destination by displaying the map data read out from the storage medium 2 on a monitor 4 together with a position of the vehicle. The position of the vehicle may be detected by, for example, a GPS receiver 5, which receives GPS signals emitted from GPS satellites. The GPS signals are ordinarily received and fed to the controller 3. The controller 3 analyzes the signals from GPS satellites received by the GPS receiver 5 to obtain information such as a position (latitude and longitude), a traveling direction, and/or a traveling speed of the vehicle.

The navigation device 1 may have a direction sensor 6 that detects a traveling direction of the vehicle or changes of the traveling direction. The direction sensor 6 may be configured by, for example, a gyro sensor, a geomagnetic sensor, an optical rotation sensor and/or a rotational variable resistor attached to a rotating section of the steering wheel, and/or an angle sensor attached to a wheel. The direction sensor 6 may output the detecting results to the controller 3.

The navigation device 1 may have a distance sensor 7 that detects a moving distance and a traveling speed of the vehicle. The distance sensor 7 may be configured by, for example, a traveling speed pulse sensor that outputs pulsed signals in every given amount of rotation of a drive shaft, a wheel and such of the vehicle, and a yaw or acceleration sensor which detects an acceleration speed of the vehicle with a circuit to double integrate the acceleration speed detected. The distance sensor 7 may output its detecting results to the controller 3.

The controller 3 in the navigation device 1 may obtain map data relating to the map information of a neighboring area of the vehicle position from the storage medium 2. The controller 3 may execute various arithmetic processes for course guidance of the vehicle according to the map data and the current position of the vehicle. The controller 3 may output control instructions for the monitor 4 and such. The controller 3 may display a map image produced based on the map data with an image that represents the current position of the vehicle superimposed on top of the map image on the monitor 4.

The controller 3 may inform a driver of the course guidance in precise timing based on the road geometry and such contained in the map data relating to the map information of the traveling direction and the current position of the vehicle using the monitor 4 and such.

The navigation device 1 may be configured to display the information data relating to spot information retrieved from the storage medium 2 on the monitor 4 and to give search guidance of spot information. The configuration to provide such search guidance of spot information is described next.

Figure 2:
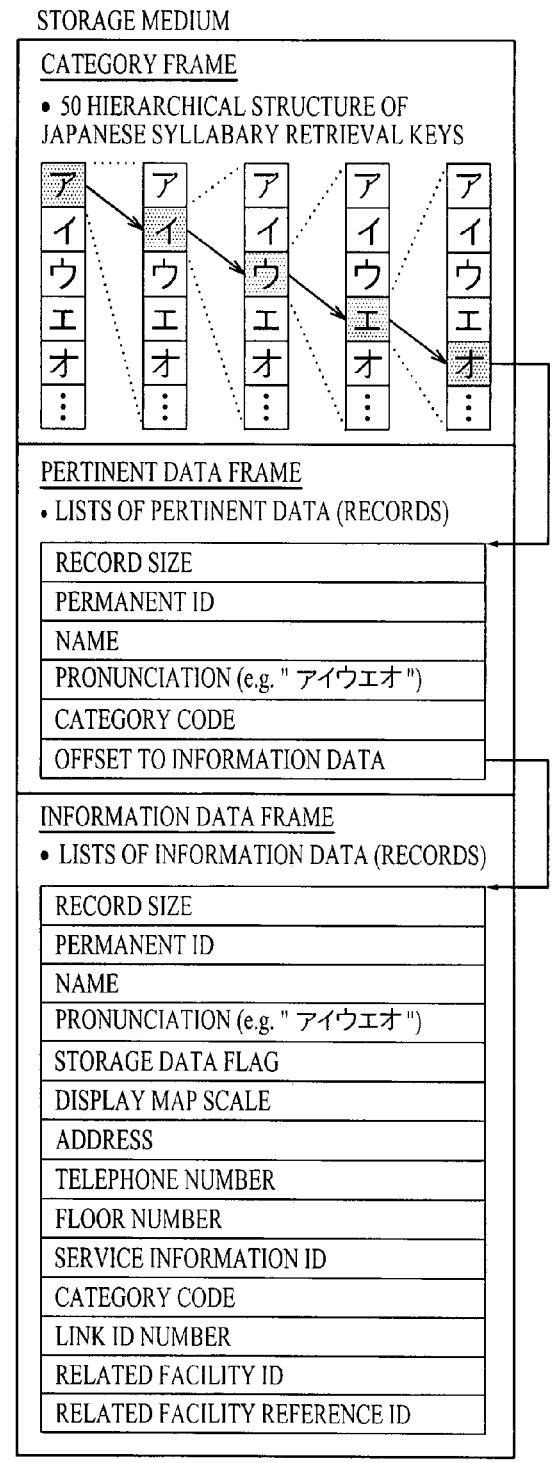
FIG. 2 is an illustration showing an exemplary data structure of a storage medium and an exemplary flow of information search guidance.

The storage medium 2 may store, for example, as indicated in FIG. 2, information data relating to spot information in an information data frame and pertinent data to specify the information data in a pertinent data frame for each category specified by retrieval keys of spot names represented in 50 syllables of the Japanese language.

Specifically, the information data frame may store lists of information data in spot record units. The information data may include a record size that represents the size of a record, a permanent ID that remains unchanged for the record, as well as various types of information such as a name of a spot, its pronunciation in the Japanese syllabary (which is the retrieval keys), a telephone number, and/or an address of the spot.

Meanwhile, the pertinent data frame may store lists of pertinent data in spot record units for each category (described later). The pertinent data may include a record size that represents the size of a record, a permanent ID that remains unchanged for the record, as well as various types of information such as a name of a spot, its pronunciation in the Japanese syllabary (which is the retrieval keys), and/or an offset to information data to specify the information data.

The storage medium 2 may have a category frame that defines the categories in the pertinent data frame. Specifically, the category frame may store the hierarchical structure of retrieval keys of the Japanese syllabary representing 50 syllables hierarchized in a plurality of levels. The categories are in a hierarchical structure, as each level of the hierarchy represents one category.

The controller 3, when providing search guidance by the retrieval keys, may reference the hierarchical structure of categories stored in the category frame, may specify the category by the pronunciation entered, may extract pertinent data in the specified category from the pertinent data frame, and may display the name of the spot and such contained in the extracted pertinent data on the monitor 4. Here the retrieval keys represent a pronunciation of a spot name, initiated by a user entering the pronunciation through a predefined operating section such as the monitor 4 with a touch panel.

When the user selects the displayed name of the spot on the monitor 4 with the touch panel, the controller 3 may reference the offset to the information data contained in the pertinent data corresponding to the selected name of the spot, may extract the information data corresponding to the name of the spot from the information data frame, and may display the detailed information of the spot and map data and such of the spot contained in the extracted information data on the monitor 4.

The navigation device 1 may have a communication section 10 (FIG. 1) that receives a predefined file from a delivery server 20 (described later) via a predefined communication line l such as the Internet. The communication section 10 may functions as an updating file input terminal that accepts an entry of an updating file to update pertinent data and information data stored in the storage medium 2.

The delivery server 20 may be set up on the side of a manufacturer and such that markets the navigation device 1.

The delivery server 20 may be composed of, for example, a computer that stores and manages the information data frame storing the latest information data to be stored in the storage medium 2 of the navigation device 1 in a storage device 30 such as a hard disk. The delivery server 20 may be configured to extract the information data frame containing the latest information data updated in the storage device 30, and to transmit the file containing the extracted information data frame as the updating file to the navigation device 1.

An information data updating section 8 of the controller 3 of the navigation device 1 may be physically, functionally, and or conceptually configured to provide updating functions to update the information data stored in the storage medium 2 by using the updating file received by the communication section 10. A pertinent data updating section 9 of the controller 3 of the navigation device 1 may be physically, functionally, and or conceptually configured to provide updating functions to update the pertinent data stored in the storage medium 2 by using the updating file received by the communication section 10.

Figure 3:
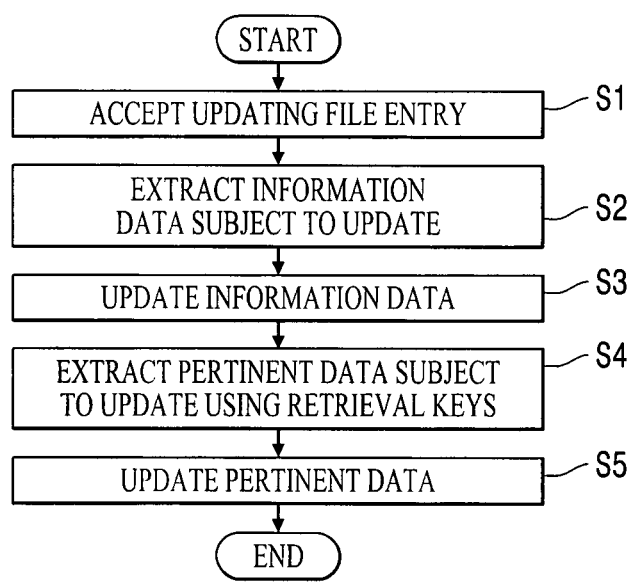
FIG. 3 is a flowchart of an exemplary data updating method.
Figure 4:
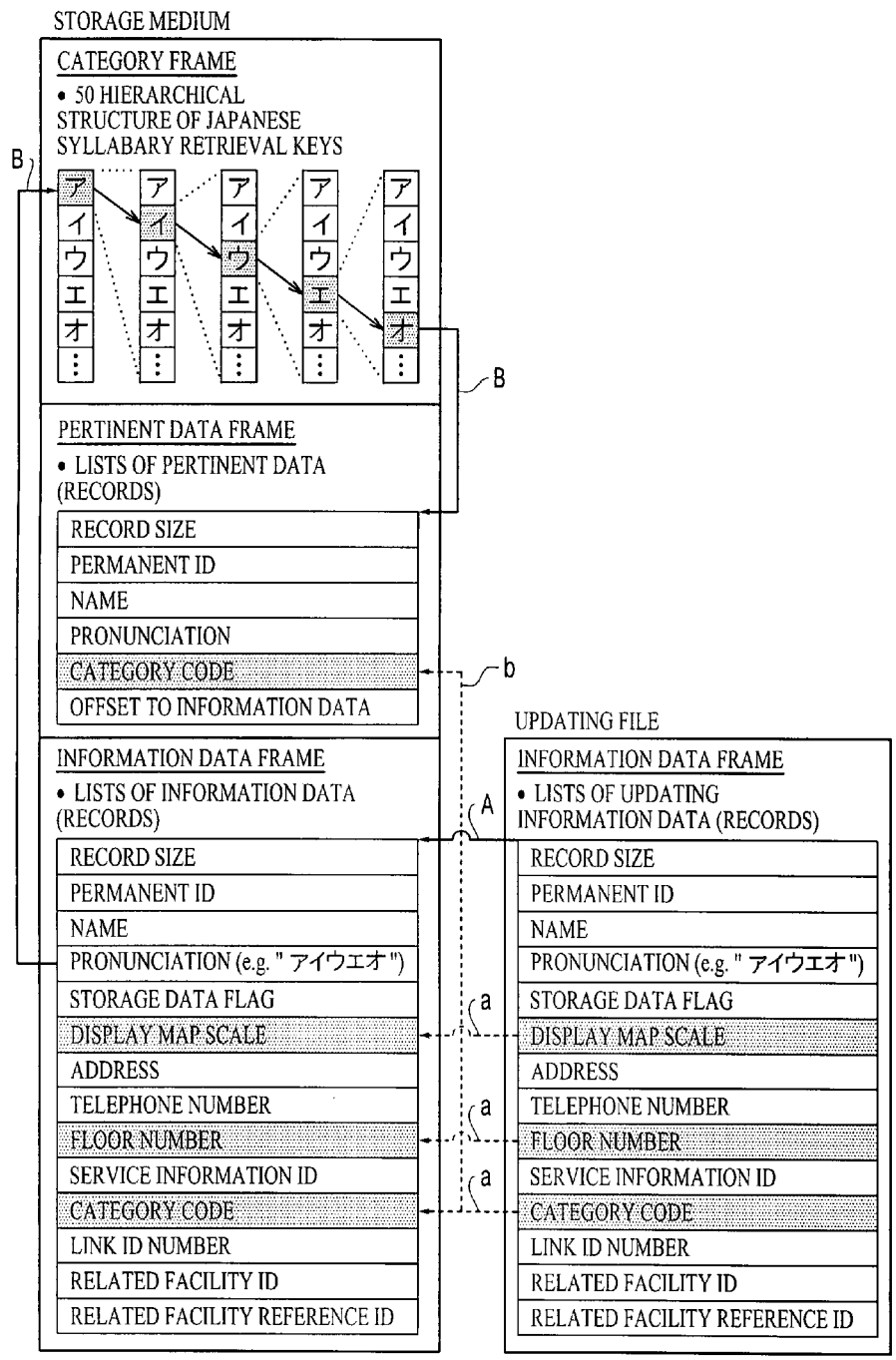
FIG. 4 is an illustration showing an exemplary updating flow of a storage medium using an updating file.

FIG. 3 shows an exemplary method for updating data and FIG. 4 shows an updating flow of the storage medium using the updating file that may be used with the method. The exemplary method may be implemented, for example, by one or more components of the above-described navigation device 1 and/or delivery server 20. However, even though the exemplary structure of the above-described navigation device 1 and/or delivery server 2 may be referenced in the description, it should be appreciated that the structure is exemplary and the exemplary method need not be limited by any of the above-described exemplary structure.

As shown in FIG. 3, the navigation device 1 accepts an entry of an updating file received by the communication section 10 (S1). The updating file received by the communication section 10 is a file containing the whole information data frame storing the updating information data that is the latest information data to be stored in the storage medium 2 and is a file of a relatively small capacity because the latest pertinent data is not included.

Next the information data subject to update is extracted from the information data frame stored in the storage medium 2 (S2) and the extracted information data is updated with the updating information data contained in the updating file (S3).

Specifically, for example, in the information data updating steps, as indicated by the arrow A in FIG. 4, the information data updating section 8 may extract the information data of the whole information data frame corresponding to the information data frame contained in the updating file as the subject to update from the storage medium 2. As indicated by the arrows a in FIG. 4, the information data updating section 8 may then update the information data by comparing the information data subject to update and the updating information data contained in the updating file, and by renewing fields in the information data subject to update which differ from those in the updating information data contained in the updating file (i.e., "map display scale," "floor number," and "category code," shown in FIG. 4) with fields corresponding to the updating information data.

Next the pertinent data in the category specified by the retrieval keys contained in the information data subject to update is extracted from the pertinent data frame stored in the storage medium 2 (S4) the extracted pertinent data is updated with the updating information data contained in the updating file (S5).

Specifically, in the pertinent data updating steps, as indicated by the arrow B in FIG. 4, the pertinent data updating section 9 references the retrieval keys, specifically the pronunciation of a spot name, contained in the information data updated by the information data updating section and extracts the pertinent data, as the subject to update, in the category specified by the retrieval keys referenced in the category frame from the pertinent data frame. As indicated by the arrow b in FIG. 4, the pertinent data updating section 9 then updates the pertinent data by comparing the pertinent data subject to update and the updating information data contained in the updating file and by renewing fields in the pertinent data subject to update which differ from those in the updating information data contained in the updating file (i.e., "category code," shown in FIG. 4) with fields corresponding to the updating information data.

By the method for updating data described above, both pertinent data and information data stored in the storage medium 2 can be updated by using a file of a relatively small capacity, as the updating file, containing only updating information data for updating the information data without including data for updating the pertinent data. This method therefore makes it possible, for example, to reduce the volume of communication and memory capacity for an entry of the updating file made by the updating file input terminal and to reduce the updating time required for executing the method for updating data.

In the example described above, the pertinent data updating section 9, when executing the pertinent data updating steps, uses a pronunciation of a spot name contained in the information data as retrieval keys to specify the category to which the pertinent data subject to update belongs. However, the retrieval keys to specify the category to which the pertinent data subject to update belongs need not be limited to the pronunciation, and other information contained in the information data, for example, a spot telephone number and address can serve as the retrieval keys.

The method for updating data using a spot telephone number as the retrieval keys to specify the category to which the pertinent data subject to update belongs may be as follows.

Figure 5:
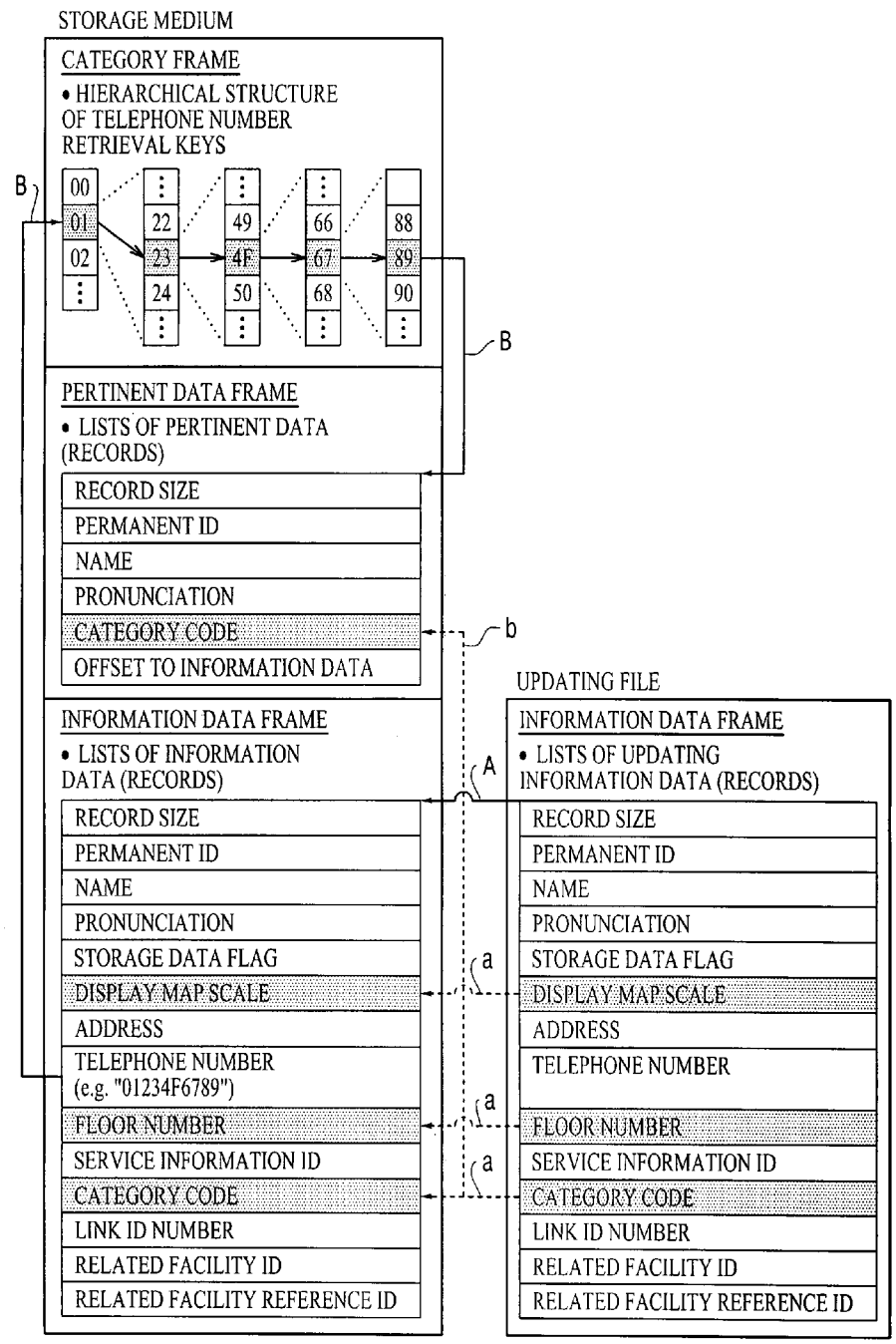
FIG. 5 is an illustration showing an exemplary updating flow of a storage medium using an updating file.

As indicated in FIG. 5 by the arrow A, the information data updating section 8 may extract the information data subject to update from the storage medium 2 and, as indicated by the arrows a in FIG. 5, may update the information data by renewing fields in the information data subject to update which differ from those in the updating information data contained in the updating file (i.e., "map display scale," "floor number," and "category code," shown in FIG. 5) with fields corresponding to the updating information data.

In the pertinent data updating steps, as indicated by the arrow B in FIG. 5, the pertinent data updating section 9 may reference the retrieval key, specifically a spot telephone number ("01234F6789", for example, whereas an "F" at the 6th digit from the left is an invalid value when the telephone number is of 9 digits), contained in the information data updated by the information data updating section. The pertinent data updating section 9 may extract the pertinent data, as the subject to update, in the category specified by the retrieval keys referenced in the category frame from the pertinent data frame. The pertinent data updating section 9 may update the pertinent data by renewing fields in the pertinent data subject to update which differ from those in the updating information data contained in the updating file (i.e., "category code," shown in FIG. 5) with fields corresponding to the updating information data.

Alternatively, data may be updated using a spot address as the retrieval keys to specify the category to which the pertinent data subject to update belongs, for example, as follows.

Figure 6:
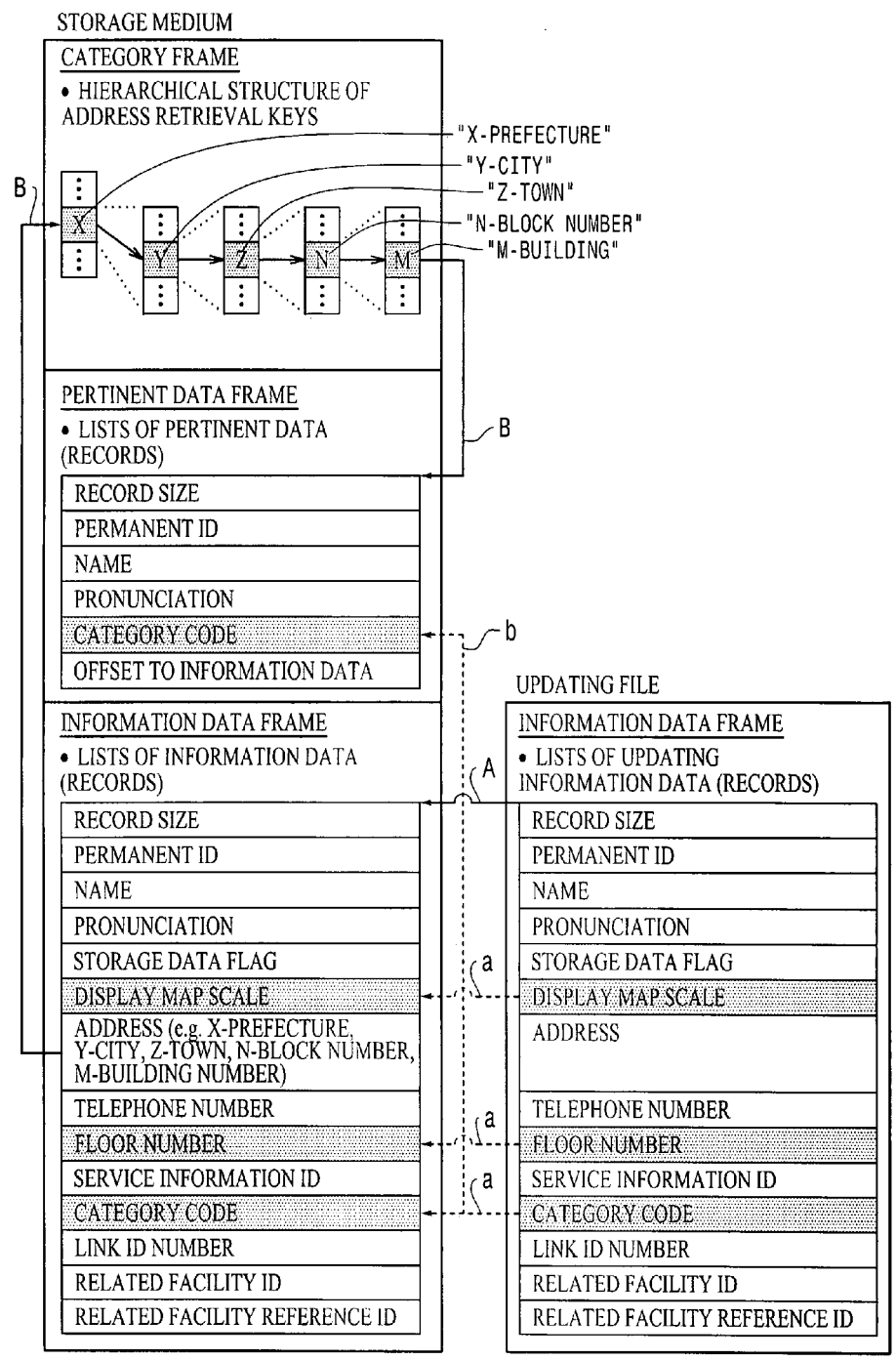
FIG. 6 is an illustration showing an exemplary updating flow of a storage medium using an updating file.
Figure 7:
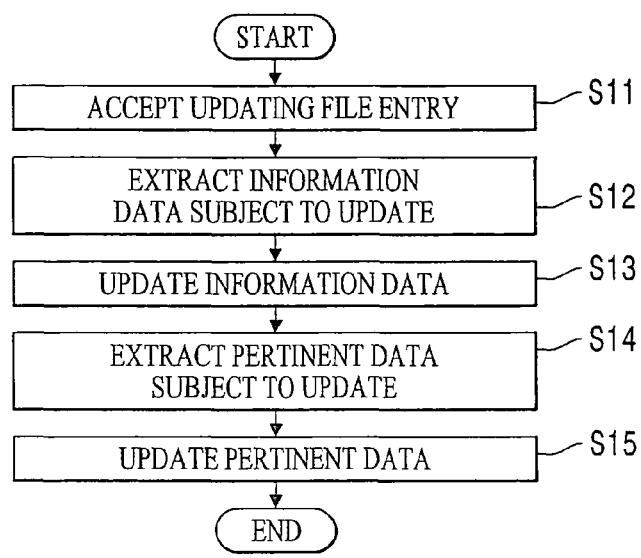
FIG. 7 is a flowchart of the process of a related art data updating method.
Figure 8:
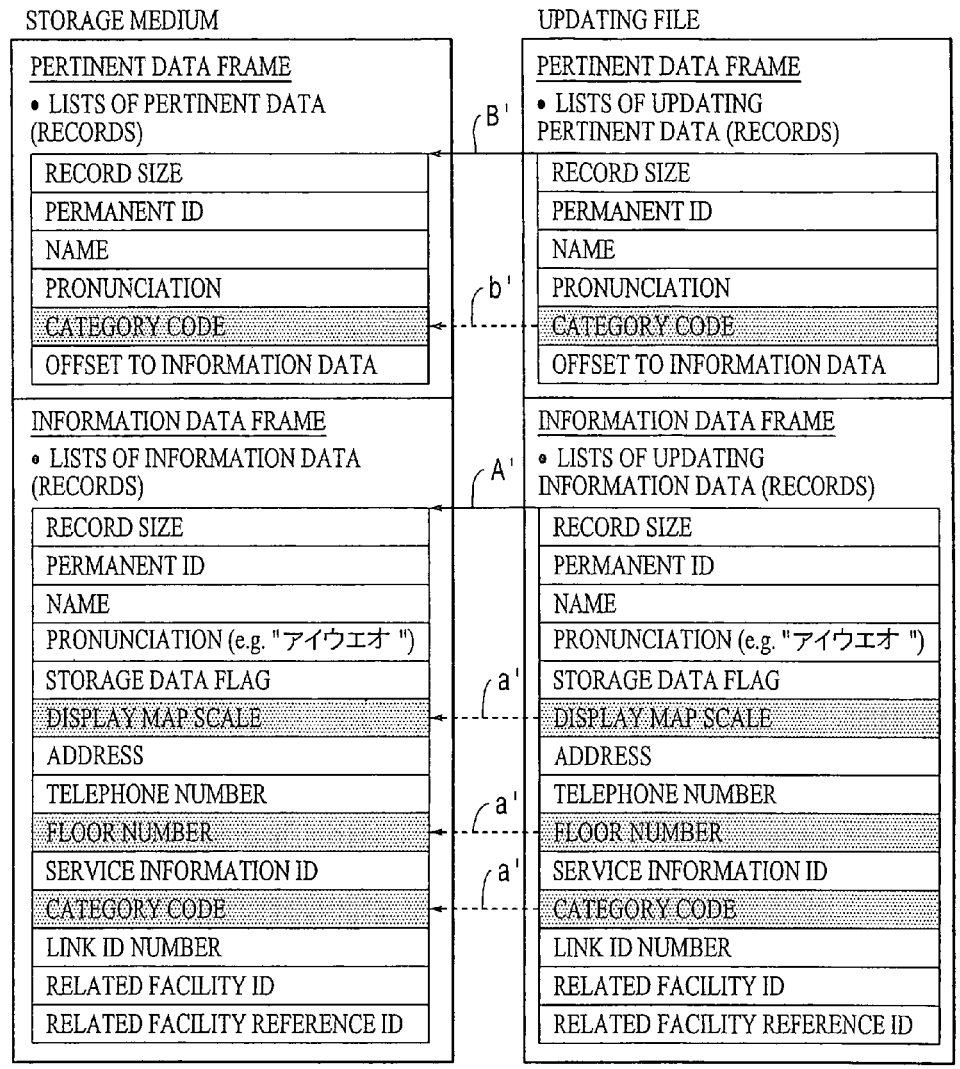
FIG. 8 is an illustration showing an updating flow of a related art storage medium using an updating file.

As indicated in FIG. 6 by the arrow A, the information data updating section 8 may extract the information data subject to update from the storage medium 2. As indicated by the arrow a in FIG. 6, the information data updating section 8 may update the information data by renewing fields in the information data subject to update which differ from those in the updating information data contained in the updating file (i.e., "map display scale," "floor number," and "category code," shown in FIG. 6) with fields corresponding to the updating information data.

In the pertinent data updating steps, as indicated by the arrow B in FIG. 6, the pertinent data updating section 9 may reference the retrieval key, specifically a spot address (for example, "X-prefecture, Y-city, Z-town, N-block number, M-building number"), contained in the information data updated by the information data updating section, may extract the pertinent data, as the subject to update, in the category specified by the retrieval keys referenced in the category frame, and may update the pertinent data by renewing fields in the pertinent data subject to update which differ from those in the updating information data contained in the updating file (i.e.: "category code," shown in FIG. 6) with fields corresponding to the updating information data.

The above-described data management system and the method for updating data can be used effectively, for example in a navigation device for updating pertinent data and information data stored in its storage medium to reduce the capacity of an updating file used for updating as much as possible.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, the above-described category of retrieval keys is configured in a hierarchical structure. However, the category may be defined, for example, as a single category for a single retrieval key, without having a hierarchical structure.

The above-described updating file input terminal is configured with the communication section 10 which receives an entry of an updating file from the delivery server 20 via the communication line I. However, the updating file may be input via a communication line such as USB directly from the delivery server, or from a mobile telephone and/or other media with which the updating file has been downloaded from the delivery server.

The above-described data management system may be applied to systems in other configurations such as a management system of various databases, such as a spot search database and a map database, which provide a search function.

What is claimed is:

1. A data management system, comprising:
a storage medium that:
for an individual spot, stores information data in a corresponding information data frame, the information data including specific information about the particular spot that is subject to update;
for the same individual spot, stores pertinent data in a pertinent data frame that is stored separate from the information data frame, the pertinent data including:
a name of the spot;
offset data that specifies the information data for the spot that is stored in the information data frame; and
retrieval key information usable to identify the pertinent data based on a search for the spot using input retrieval keys; and
stores category data in a category frame, the category data usable to identify the pertinent data for the spot based on the retrieval key information in the pertinent data; and
a CPU that:
receives an updating file containing updating information for the spot, the updating information corresponding to only the information data in the information data frame, the received updating file not containing updating pertinent data;
for the individual spot:
first compares the information data to the updating information;
based on the first comparison, determines which portion of the information data is subject to update;
extracts the information data subject to update from the information data frame;
updates the extracted information data with the updating information data for the spot contained in the received updating file;
identifies the pertinent data for the spot stored in the pertinent data frame by using a retrieval key contained in the information data subject to update from the pertinent data frame;
second compares the identified pertinent data for the spot to the updating information;
based on the second comparison, determines which portion of the pertinent data is subject to update;
extracts the pertinent data subject to update from the pertinent data frame; and
updates the extracted pertinent data with corresponding parts of the updating information corresponding to only the information data contained in the updating file.

2. The data management system according to claim 1, further comprising an updating file input terminal that receives the updating file via a communication line.

3. The data management system according to claim 1, wherein the category specified by the retrieval key contained in the information data subject to update has a hierarchical structure.

4. The data management system according to claim 1, wherein the system is configured as a navigation device.

5. The data management system according to claim 4, wherein the retrieval key is a name pronunciation.

6. The data management system according to claim 4, wherein the retrieval key is a telephone number.

7. The data management system according to claim 4, wherein the retrieval key is an address of a spot.

8. The data management system according to claim 1, wherein the controller:
compares the extracted pertinent data and the updating information data contained in the received updating file;
identifies fields in the extracted pertinent data having corresponding fields in the updating information data; and
renews an identified field in the extracted pertinent data having contents that are different from contents of its corresponding field in the updating information data.

9. A method for updating data stored in a storage medium, comprising:
storing, for an individual spot, stores information data in a corresponding information data frame, the information data including specific information about the particular spot that is subject to update;
storing, for the same individual spot, stores pertinent data in a pertinent data frame that is stored separate from the information data frame, the pertinent data including:

a name of the spot;
offset data that specifies the information data for the spot that is stored in the information data frame; and
retrieval key information usable to identify the pertinent data based on a search for the spot using input retrieval keys;
storing category data in a category frame, the category data usable to identify the pertinent data for the spot based on the retrieval key information in the pertinent data; and
receiving an updating file containing updating information for the spot, the updating information corresponding to only the information data in the information data frame, the received updating file not containing updating pertinent data;
for the individual spot:
first comparing the information data to the updating information;
based on the first comparison, determining which portion of the information data is subject to update;
extracting the information data subject to update from the information data frame;
updating the extracted information data with the updating information data for the spot contained in the received updating file;
identifying the pertinent data for the spot stored in the pertinent data frame by using a retrieval key contained in the information data subject to update from the pertinent data frame;
second comparing the identified pertinent data for the spot to the updating information;
based on the second comparison, determining which portion of the pertinent data is subject to update;
extracting the pertinent data subject to update from the pertinent data frame; and
updating the extracted pertinent data with corresponding parts of the updating information corresponding to only the information data contained in the updating file.

10. The method according to claim 9, further comprising receiving the updating file via a communication line.

11. The method according to claim 9, wherein the category specified by the retrieval key contained in the information data subject to update has a hierarchical structure.

12. The method according to claim 9, wherein the retrieval key is a name pronunciation.

13. The method according to claim 9, wherein the retrieval key is a telephone number.

14. The method according to claim 9, wherein the retrieval key is an address of a spot.

15. The method according to claim 9, further comprising:
comparing the extracted pertinent data and the updating information data contained in the received updating file;
identifying fields in the extracted pertinent data having corresponding fields in the updating information data; and
renewing an identified field in the extracted pertinent data having contents that are different from contents of its corresponding field in the updating information data.

16. A data management system, comprising:
means for storing, for an individual spot, stores information data in a corresponding information data frame, the information data including specific information about the particular spot that is subject to update;
means for storing, for the same individual spot, stores pertinent data in a pertinent data frame that is stored separate from the information data frame, the pertinent data including:
a name of the spot;
offset data that specifies the information data for the spot that is stored in the information data frame; and
retrieval key information usable to identify the pertinent data based on a search for the spot using input retrieval keys;
means for storing category data in a category frame, the category data usable to identify the pertinent data for the spot based on the retrieval key information in the pertinent data; and
means for receiving an updating file containing updating information for the spot, the updating information corresponding to only the information data in the information data frame, the received updating file not containing updating pertinent data;
means for, for the individual spot:
first comparing the information data to the updating information;
based on the first comparison, determining which portion of the information data is subject to update;
extracting the information data subject to update from the information data frame;
updating the extracted information data with the updating information data for the spot contained in the received updating file;
identifying the pertinent data for the spot stored in the pertinent data frame by using a retrieval key contained in the information data subject to update from the pertinent data frame;
second comparing the identified pertinent data for the spot to the updating information;
based on the second comparison, determining which portion of the pertinent data is subject to update;
extracting the pertinent data subject to update from the pertinent data frame; and
updating the extracted pertinent data with corresponding parts of the updating information corresponding to only the information data contained in the updating file.

17. The data management system according to claim 16, further comprising:
means for comparing the extracted pertinent data and the updating information data contained in the received updating file; and
means for identifying fields in the extracted pertinent data having corresponding fields in the updating information data;
wherein the means for updating renews an identified field in the extracted pertinent data having contents that are different from contents of its corresponding field in the updating information data.

* * * * *